March 2, 1965
C. P. KAUFMANN ETAL
3,171,219
DREDGE AND TUNNEL CONSTRUCTION APPARATUS
COMPRISING A DOWNWARDLY INCLINED HOUSING
MOUNTING A CUTTER AND MOTOR THEREFOR
Filed Oct. 17, 1962
5 Sheets-Sheet 3
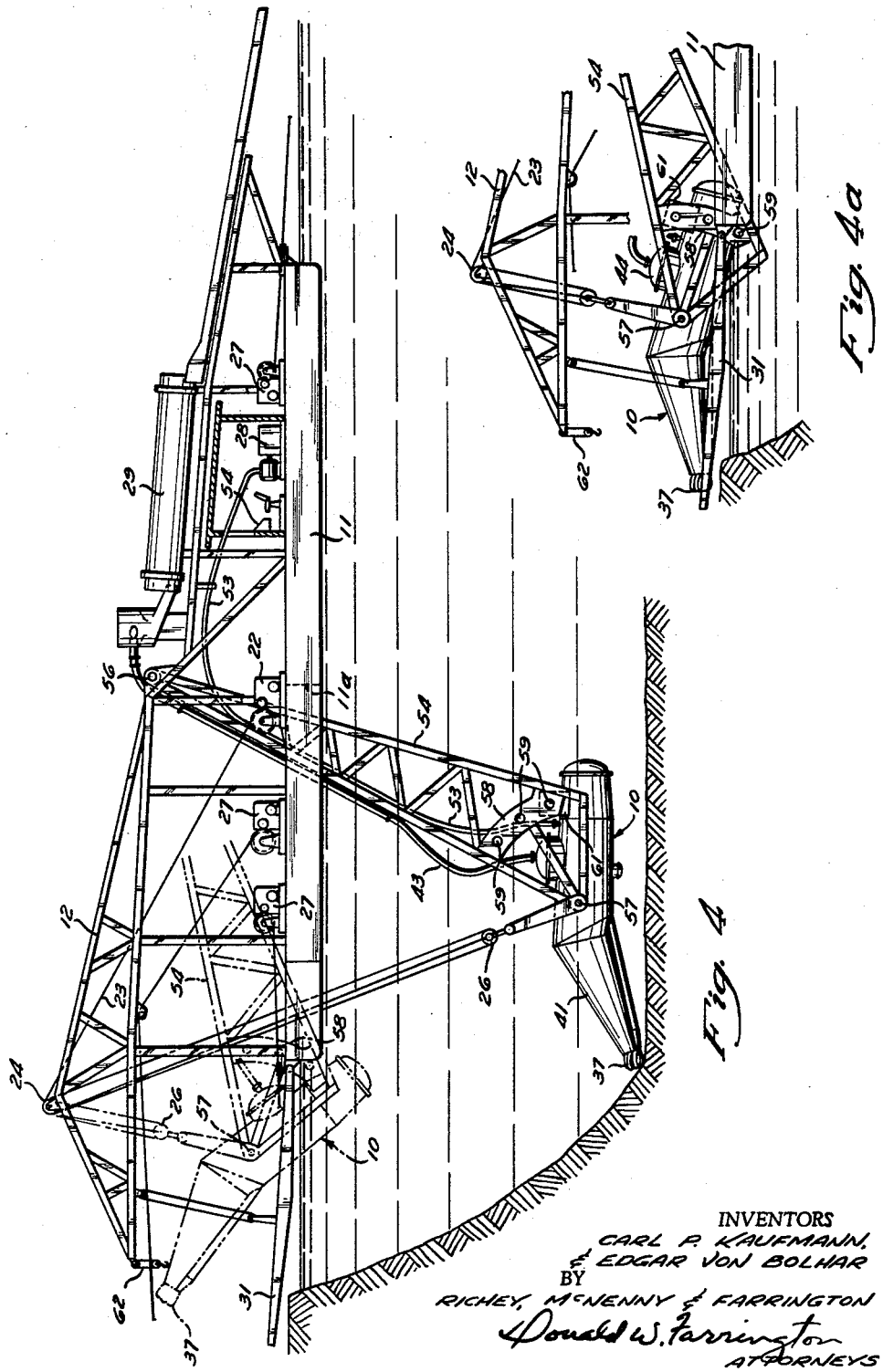
INVENTORS
CARL P. KAUFMANN,
& EDGAR VON BOLHAR
BY
RICHEY, McNENNY & FARRINGTON
Donald W. Farrington
ATTORNEYS

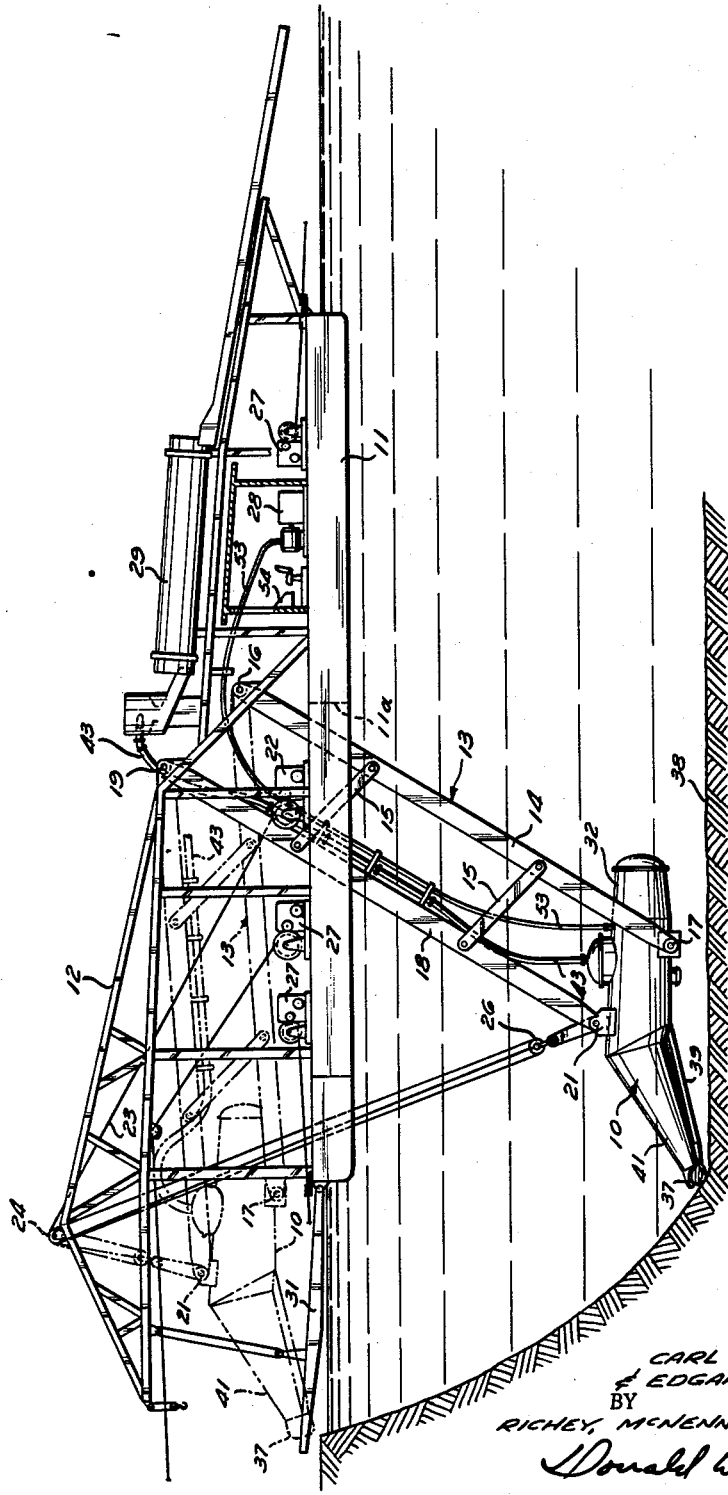

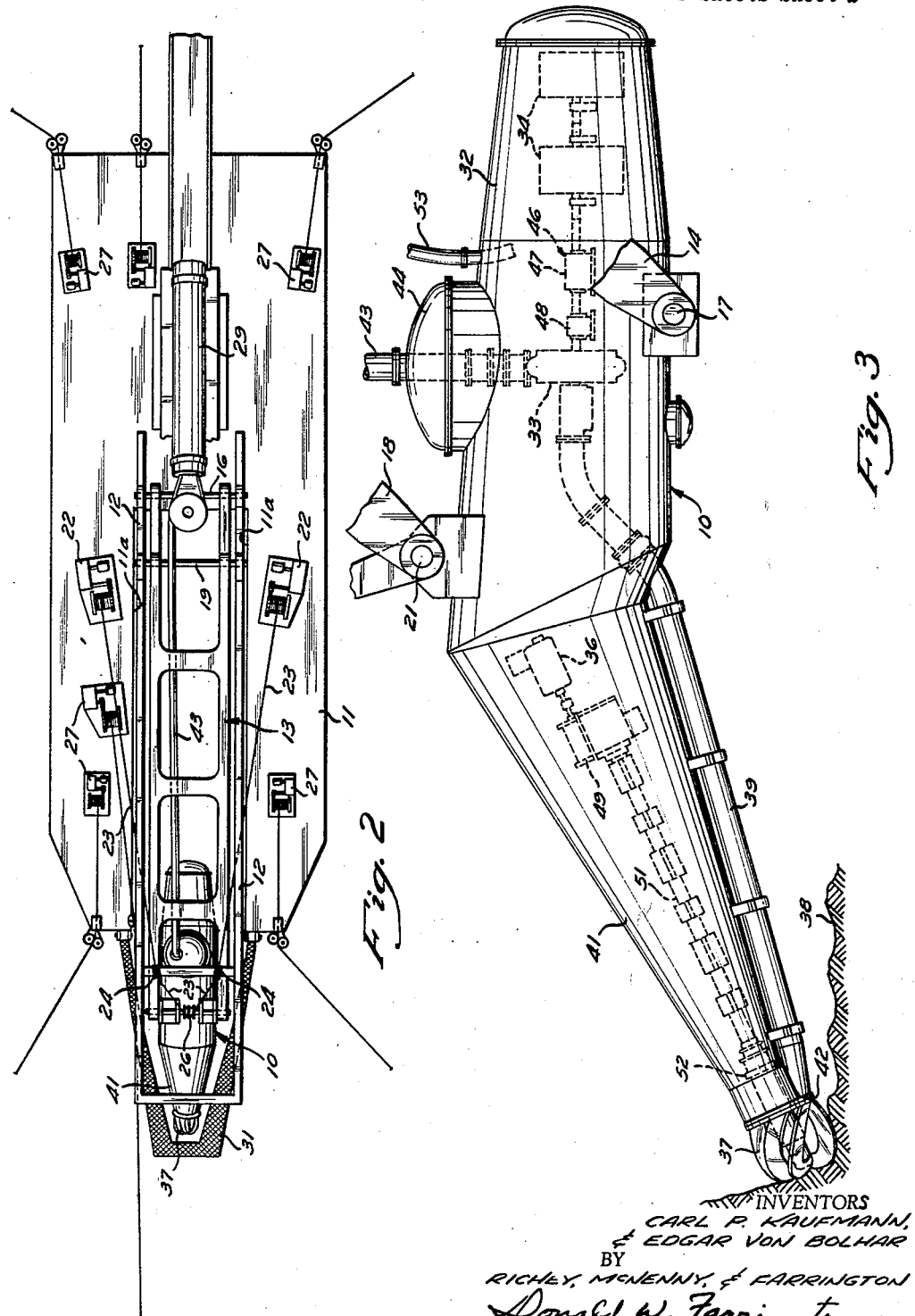

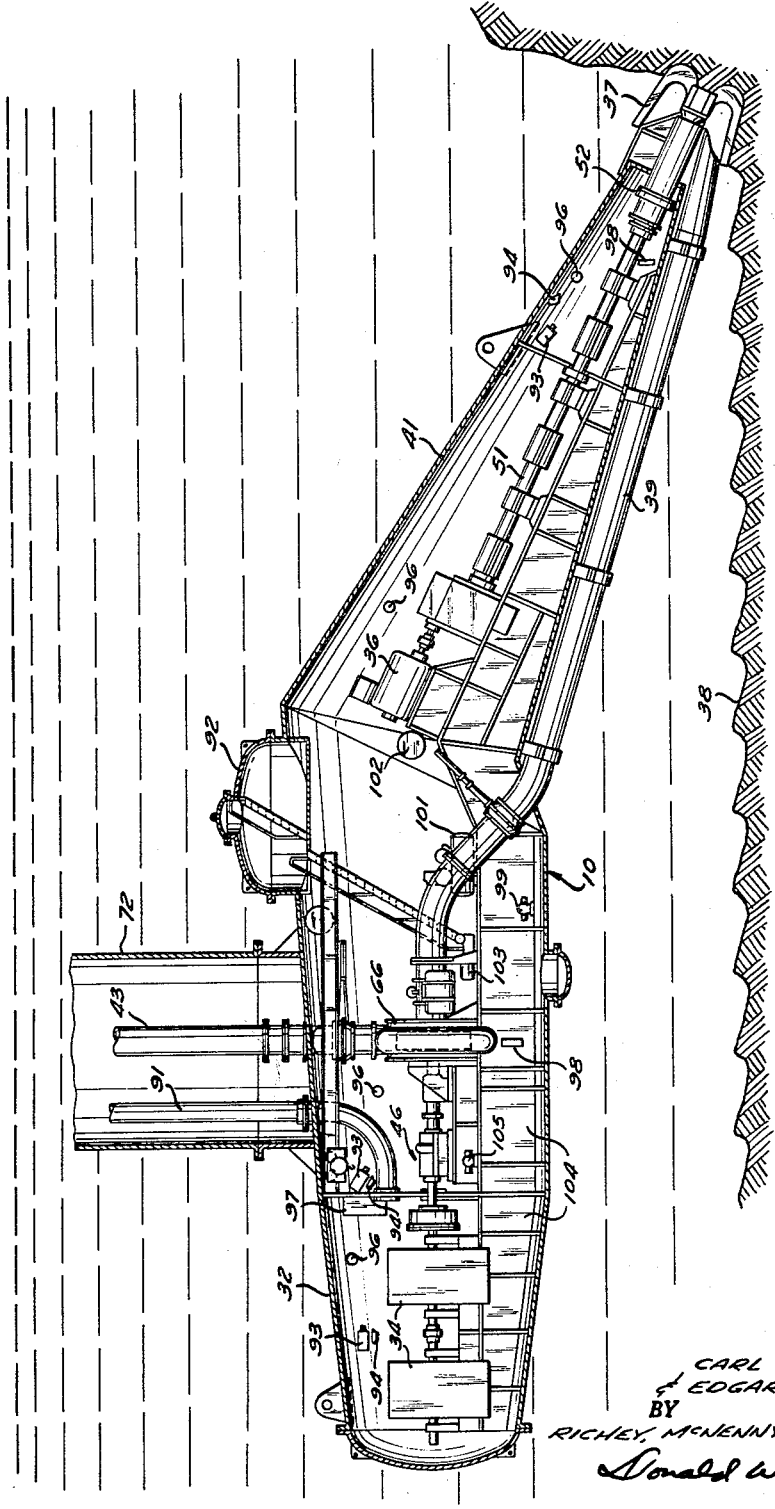

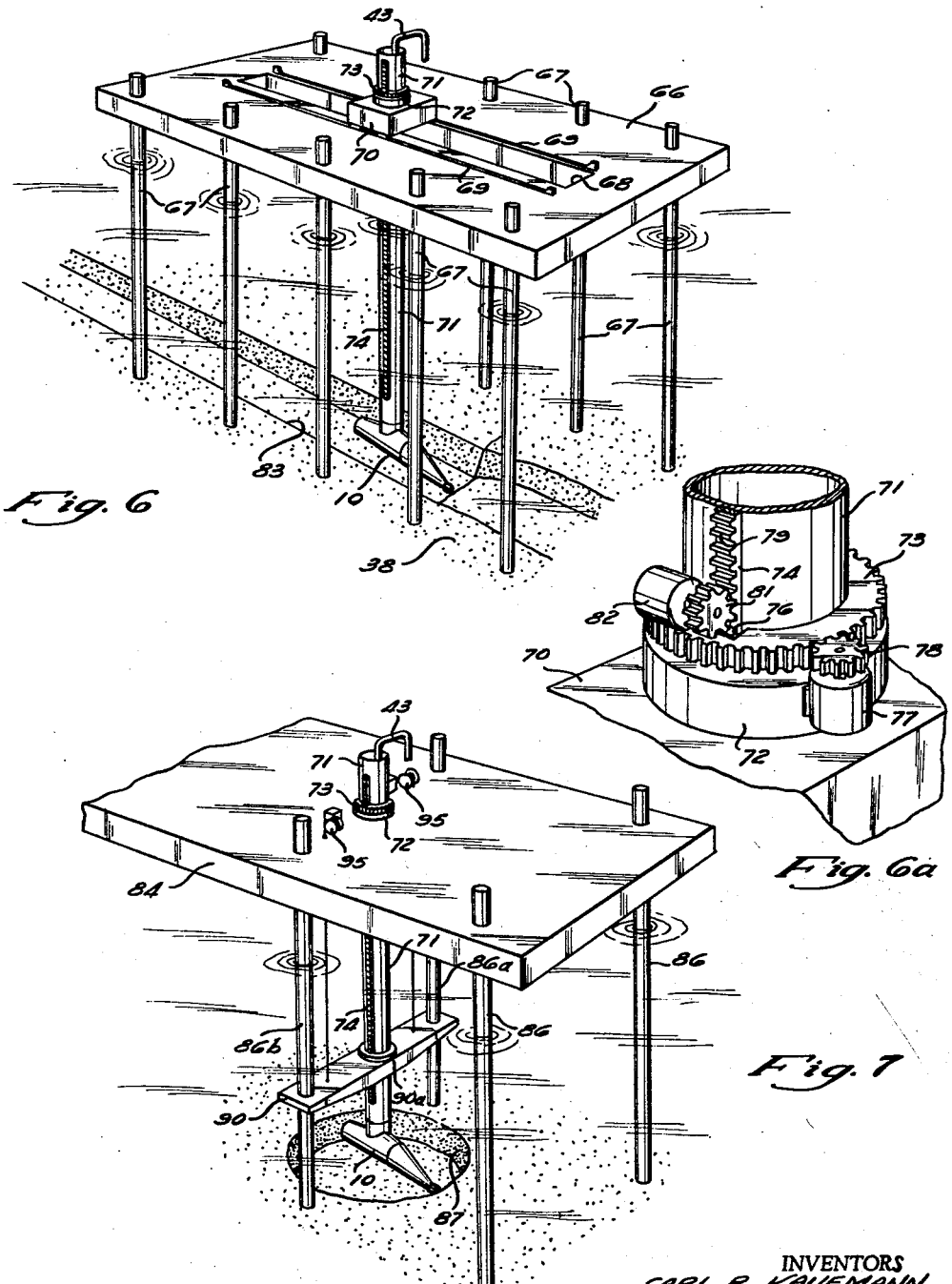

United States Patent Office

3,171,219
Patented Mar. 2, 1965

3,171,219
DREDGE AND TUNNEL CONSTRUCTION APPARATUS COMPRISING A DOWNWARDLY INCLINED HOUSING MOUNTING A CUTTER AND MOTOR THEREFOR
Carl P. Kaufmann, Baltimore, and Edgar J. Von Bolhar, Severna Park, Md., assignors to Ellicott Machine Corp., Baltimore, Md., a corporation of Maryland
Filed Oct. 17, 1962, Ser. No. 231,203
2 Claims. (Cl. 37—56)

This invention relates generally to hydraulic dredges and more particularly to a novel and improved dredging apparatus suitable for operations at substantial depths below the surface of a body of water.

Conventional hydraulic dredges are customarily supported on floating hulls and provided with a ladder on the hull which extends downwardly therefrom to the bottom. A rotatable cutter is mounted on the ladder and is powered by a motor on the hull. A pump on the hull is provided with an inlet pipe extending down along the ladder to a position adjacent to the cutter. The cutter operates to loosen the bottom material which is drawn through the inlet up along the ladder to the hull and is then discharged at any desired location.

Dredges with the pump and the cutter drive supported on the hull cannot economically operate at substantial depths below the water surface, since pumps on such dredges are located at or above the surface and must operate by producing a vacuum to carry the bottom material and water up along the inlet pipe a substantial distance. The maximum differential pressure available to move the bottom material and water along the intake pipe is no greater than atmospheric pressure even though the pressure at the bottom is substantially higher than atmospheric pressure. Since the amount of material that can be carried by a given amount of water pumped is a function of the water velocity and since the intake velocity at a given differential pressure is an inverse function of the length of the intake pipe, this maximum differential pressure provides a limit to the depth of efficient operation of such dredges. These factors combine to make it economically impractical to operate such conventional dredges at a depth in excess of 80 feet when dredging coarse heavy materials and 100 feet even when dredging relatively light materials. Therefore, clam shell type dredges are often used when operating at greater depths. However, such clam shell dredges do not have other advantages found in hydraulic dredges. Also, depth limiting factors are involved due to the necessity of providing a drive extending the length of the ladder from the cutter drive motor to the cutter located at the lower end thereof.

With the novel and improved dredge incorporating the present invention, it is possible to dredge at substantially any depth making it practical to use hydraulic dredging for mining, excavating or construction work at depths well in excess of 150 feet below the surface of the body of water. A dredge incorporating the present invention is suitable for use in the digging of ditches, troughs, trenches or channels under bodies of water at substantial depths in which tubes and tunnels for trains and automobiles or pipe lines for oil, gas and water and the like can be positioned. Also, a dredge incorporating our invention is suitable for mining at substantial depths below the surface of the body of water and is particularly useful in such operations when the water currents tend to shift material into the area excavated by the dredge, thus providing a continuous supply of material to be mined without moving the dredge from one location to another.

The dredge unit incorporating this invention includes a hull which is water-tight and submergible below the surface of the water. Mounted in the hull are all of the various power assemblies and the hydraulic pump for the dredge. Mounted at one end of the hull is a power-driven cutter connected for rotation by a motor contained within the hull. With the use of this water-tight hull, it is possible to locate the pump substantially adjacent to the bottom of the body of water so that a differential pressure approaching the pressure of the water at the bottom is available for moving the slurry of bottom material and water through the intake pipe to the pump. Hydraulic pumps are capable of developing substantially any required outlet pressure to move such slurry to the surface of the water even from substantial depths. The motor driving the cutter is located in the hull substantially adjacent to the cutter so that the need of extended mechanical drives for the cutter is eliminated. Because a water-tight hull is provided, it is not necessary to utilize special water-tight machinery and conventional pumps and electric motors without water-tight casings can be used.

The water-tight hull can be supported in any one of several ways depending upon the type of operation being performed and the supporting structure available. The hull can be supported by a ladder extending down from a floating dredge or supported from a stationary or movable platform of the type described in the United States Patent to Lucas No. 3,001,592, dated September 26, 1961. Ballast means are preferably provided in the hull to control the buoyancy between posiitve and negative to reduce the loads on the support structure.

It is an important object of this invention to provide a novel and improved submergible dredge apparatus containing a hydraulic pump, a cutter and drives therefor.

It is another object of this invention to provide a novel and improved submergible dredge unit containing the various drive and power units substantially adjacent to the bottom of the body of water so that the unit is capable of operating at considerable depths below the surface.

It is still another important object of this invention to provide a novel and improved submergible dredge unit including a water-tight hull containing the drive machinery and pump for the dredge formed with an extension inclined downwardly from one end of the hull supporting a cutter operable to loosen under water bottom material.

It is still another object of this invention to provide a remote controlled submergible dredge unit containing the dredging machinery substantially adjacent to the dredging operation in combination with a support extending from the surface of the body of water to the dredge unit operable to position and move the dredge unit with respect to the bottom of a body of water.

It is still another object of this invention to provide a novel and improved submergible dredge unit containing the power drives and pump apparatus for dredging in combination with a support extending from the surface of a body of water to said dredge unit and control means arranged to permit the control and monitoring of the equipment from the surface of the body of water.

It is still another object of this invention to provide a submergible dredge unit supported from a non-submergible work platform by link means pivoted on the platform for positioning the submergible unit wherein the submergible unit includes a water-tight hull supporting a cutter and containing a pump and drives for the cutter and pump in which the hull is proportioned to provide displacement buoyancy greater than the weight of the hull and equipment contained therein.

It is still another object of this invention to provide a submergible dredge unit as described in the last-preceding object wherein controllable ballast means are provided in said hull operable to selectively change the buoyancy between positive and negative.

Further objects and advantages will appear from the following description and drawings wherein:

FIGURE 1 is a side elevation of a floating dredge supporting a submergible dredging unit illustrating the operation of the dredge unit and the manner in which it can be lifted to the surface.

FIGURE 2 is a plan view of the floating dredge of FIGURE 1 with certain parts of the superstructure removed for purposes of clarity;

FIGURE 3 is an enlarged side elevation of the submergible dredge unit;

FIGURE 4 is a side elevation of a floating dredge illustrating another form of support structure for the submergible dredge unit;

FIGURE 4a is a fragmentary view illustrating the dredge unit in the raised position;

FIGURE 5 is an enlarged side elevation in longitudinal section illustrating one preferred equipment arrangement for the submergible dredge unit;

FIGURE 6 is a schematic illustration of another form of dredging structure in which the submergible dredge unit is supported from a tower mounted on caissons extending up from the bottom of the body of water wherein the support for the dredge unit is arranged to permit its movement along the tower structure;

FIGURE 6a is an enlarged fragmentary view of the power drive for controlling the position and movement to the dredge unit support column; and FIGURE 7 is a schematic illustration of still another form of dredging structure wherein the submergible dredge unit is supported from a fixed tower for only vertical and rotary movement with respect thereto.

Referring to the drawings, FIGURES 1 through 3 illustrate one embodiment of this invention wherein a submergible dredge unit 10 is supported on a floating dredge 11. Mounted on the hull of the floating dredge 11 is a superstructure or support frame 12 which carries a ladder 13 connected to the dredge unit 10. The ladder 13 is a parallelogram mechanism including a first beam 14 pivoted to the frame 12 at 16 and to the dredge unit 10 at 17. A second beam 18 is pivoted to the frame 12 at 19 and to the dredge unit 10 at 21. The pivots 16, 17, 19 and 21 are arranged so that they cooperate with the frame 12 and dredge unit 10 to form a parallelogram so that the dredge unit 10 is maintained in a fixed horizontal position regardless of the depth of the unit. Braces 15 provide strength and rigidity to the ladder 13. Lifting winches 22 mounted on the dredge 11 are provided with cables 23 extending over a hoist pulley 24 on the frame 12 and a second hoist pulley 26 connected to the pivot 21. The winches 22 serve to raise or lower the dredge unit 10 between the lower position illustrated in FIGURE 1 in full line to the raised phantom line view of FIGURE 1. The structure is arranged so that the winches 22 can be used to raise the dredge unit 10 to a position clear of the water when the dredge unit is to be serviced or the dredge is to be moved from one location to another.

Other apparatus mounted on the dredge 11 includes anchor winches 27 to position and move the dredge as required, and a motor generator unit 28 to supply electrical power. A separator or treatment plant schematically illustrated at 29 may be provided to concentrate the material being dredged in the event the dredge is used, for the mining of minerals or underwater ore. In the event that the dredge is used merely to excavate, a treatment plant as shown at 29 would not be utilized.

A work frame 31 is pivoted on the hull of the dredge 11 so that it can be positioned around the dredge unit 10 when it is raised above the surface of the water for service or maintenance. Preferably the hull of the floating dredge 11 is constructed as illustrated in FIGURE 2 with a central opening 11a extending longitudinally from the forward end of the dredge through which the ladder 13 and dredge unit 10 can be raised and lowered.

Referring to FIGURE 3, the dredge unit 10 includes a water-tight hull 32 housing a hydraulic pump 33, drive motors 34 for the pump 33 and drive motors 36 for a rotating cutter 37. The cutter 37 may be of any suitable design adapted to loosen the material of the bottom 38 so that it may be drawn into the end of an intake pipe 39 for the pump 33. Preferably the intake pipe 39 extends along the lower side of an extension 41 of the hull 32 which extends from one end and is inclined downwardly therefrom. The end of the intake pipe 39 is open to the lower rearward side of the cutter 37 at 42 and extends through the wall of the hull 32 to the interior thereof connecting with the pump 33. The outlet pipe 43 of the pump 32 extends up through a hatch 44 in the hull 32 over the pump 33 to the surface. In the embodiment illustrated in FIGURE 1, the outlet pipe 43 extends to the refining unit 29. The pipe 43 is either flexible or is provided with swivel joints so that it will accommodate raising and lowering of the ladder.

One or more motors 34 are connected to the pump 33 by a drive 46 including a thrust bearing 47 and a journal bearing 48. In the illustrated embodiment two motors 34 are connected to drive the pump 33. The cutter motor 36 is connected through a speed reducing unit 49 to the cutter 37 by means of a cutter drive 51. A stuffing box 52 is mounted in the forward end of extension 41 around the cutter drive 51 to prevent leakage of water into the hull. The stuffing box 52 is the only dynamic seal required since it is the only point where a moving part extends through the hull 32. Therefore, maintenance of the fluid-tight condition of the dredge unit 10 is easily achieved.

The extension 41 is preferably formed with a conical shape tapered toward the forward end adjacent to the cutter 37 so that the hull adjacent to the cutter 37 has a cross-sectional area no greater than the area of the cutter. This permits the dredge unit 10 to be used for undercutting when desired. Very efficient dredging is achieved in many types of bottoms 38 by undercutting with the cutter 37 causing the bottom material to fall of its own weight thereby loosening itself rather than requiring the use of power with the cutter 37 to produce the loosening action. Because the extension 41 is inclined in a downward direction from the main portion of the hull 32, adequate clearance is provided for the dredging unit.

Preferably the motors 34 and 36 are electric and are supplied with power through a power cable 53 extending from the motor generator unit 28. Suitable controls are provided on the dredge 11 to permit the operator to accurately control the operation of the motors 34 and 36 from a control panel 54 located on the dredge 11. Thus, the dredge 11 provides a work platform above the water surface from which the dredge operation is controlled.

Because the dredge unit 10 is water-tight, it is possible to use conventional motors 34 and 36, a conventional pump 33 and conventional drive accessories without necessitating the use of individually water-proofed units. The cutter drive 51 is relatively short thereby eliminating any severe bearing or support problems which would be present if a long drive were required between the cutter and a motor located on the deck. Also the location of the pump 33 adjacent to the bottom 38 improves efficiency in two ways. First, the intake pipe 39 is relatively short and secondly, the differential pressure available for moving the material along the intake pipe is the pressure at the bottom 38 and not merely atmospheric pressure. The outlet pressure of the pump 33, of course, is not limited by the environment and sufficient pressure is developed to move the excavated material up the outlet pipe 43 even when substantial distances are involved. An additional advantage is produced by the fact that it is not necessary to construct the ladder 13 so that a mechanical drive extends therealong and a certain amount of flexibility of the ladder 13 is permissible without producing severe drive bearing complications. A dredge unit incorporating this invention is capable of extremely high outputs at great depths in excess of 150 feet.

FIGURES 4 and 4a illustrate a second embodiment of a support structure for the submergible dredge unit 10. In this embodiment a ladder 54 is constructed as a substantially rigid truss support at a single pivot 56 on the frame 12. The lower end of the ladder 54 is connected by pivot 57 to the dredge unit 10. To lock the dredge unit 10 against pivotal movement around the pivot 57, the ladder 54 is provided with a lock plate 58 of an arcuate shape having a plurality of lock pin holes 59 through which a lock can be selectively inserted into a mounting bracket 61 on the dredge unit 10. Therefore, the dredge unit 10 is locked against rotation about the pivot 57 in any one of a plurality of positions by a pin extending through one of the lock pin holes 59. When the dredge is to be operated with the ladder 54 in a near vertical position, as illustrated in FIGURE 4, the dredge unit 10 is locked in a position which will cause the dredge unit to be substantially horizontal when operating at the required depth. If the dredge is to be operated in shallower water where the angle of the ladder is not as steep, the dredge unit is locked in position so that it is substantially horizontal at the shallow working depth. When the dredge unit 10 is raised to the surface, as illustrated by the phantom line position of FIGURE 4, the dredge unit 10 is inclined upwardly by an angle determined by the selected lock position. A winch line 62 is connected to the dredge unit 10 and the pin removed from the lock plate 58 to pivot the dredge to the horizontal position of the FIGURE 4a illustration for transport or service of the unit.

FIGURE 6 illustrates still another embodiment of mounting the submergible dredge unit 10. In this embodiment, the unit is supported from a tower structure of the type disclosed in the patent to Lucas cited above. Such a tower is schematically illustrated and includes a work platform 66 supported on caissons 67 resting on or embedded in the bottom 38. The work platform is provided with a longitudinally extending opening 68 and tracks 69 on either side thereof. A support car 70 is movable along the tracks and provides a mounting for a hollow support column 71 supporting the dredge unit 10. The column 71 is mounted on the car 70 in the manner illustrated schematically in FIGURE 6a. The column 71 extends through bearings in a support 72 so that it is free for vertical and rotary movement relative thereto. Journaled on the support 72 is a bull gear 73 extending around the column 71 and locked against rotation relative thereto by a key 74 mounted on the column 71. The key 74 slides along a keyway 76 formed in the bull gear 73. A motor 77 is mounted on the support 72 and operates to drive a pinnion gear 78 to produce rotation of the bull gear and in turn, the column 71 with respect to the support 72. This operates to rotate the column 71 with respect to the support car 70 and in turn, rotate the dredge unit 10 about the axis of the column 71.

To raise and lower the dredge unit 10, the key 74 is provided with gear teeth 79 engaged by a pinnion 81 driven by a motor 82 mounted on the bull gear 73. Operation of the motor 82 raises or lowers the column 71. Thus, the rotation and vertical movement of the dredge unit 10 is controlled by the motors 77 and 82. Suitable motors (not shown) are also provided to control the movement of the car 70 along the tracks 69 so that the dredge unit can be used to excavate a ditch 83 as illustrated in FIGURE 6. When the car 70 is moved to the extreme of the opening 68, the support tower is moved to a new position and dredging continued.

In FIGURE 7, another form of support is illustrated in which a work platform 84 is supported on caissons 86 in a manner similar to those shown in the embodiment in FIGURE 6. In this embodiment, however, the column 71, the dredge unit 10 can only be raised, lowered and rotated about the axis of the column 71. Therefore, the bull gear structure of FIGURE 6a is mounted directly on the work platform 84. This embodiment is used for mining in a location where the water currents continuously fill a circular excavated area 87 formed by the dredge unit 10 thus providing a continuing supply of ore to be dredged without moving the dredge unit other than in a rotary and vertical path. This arrangement is also used for removing littoral sand drifts at channel or harbor entrances.

A saddle 90 extends between two opposed caissons 86a and 86b and around the column 71, winches 95 are arranged to raise and dower the saddle 90 so that it may be positioned adjacent to the dredge unit 10 during the dredging operation but can be raised when the dredge unit is raised to the surface for service and the like. The saddle 90 provides lateral support to resist the cutter reaction adjacent to the dredge unit 10 thereby eliminating excessive lateral strains on the column 71. A bearing 90a on the saddle 90 engages the column 71 to provide this lateral support and is provided with a keyway for the passage of the key 74.

FIGURE 5 illustrates the internal detail of one preferred form of the dredge unit 10 and also illustrates the mounting of the dredge unit on the column 71. In this mounting arrangement, the outlet pipe 43 of the pump 66 extends up through the column 71 along with a service conduit 91 which carries the electrical power to the motors 34 and 36. Since the column 71 attaches to the hull 32 above the pump 66, a forward hatch 92 is provided for removal of the pump.

Normally, the dredge unit 10 is not occupied when it is operating and is controlled remotely from the work platform. Therefore, close circuit television cameras 93 and lights 94 are provided so that the operator at the surface can monitor the operation of the equipment. In addition, microphones 96 are located at strategic locations so that the operator can hear any unusual noises created by machinery malfunction. An instrument panel 97 is viewed by one of the television cameras 93 so that the operator is provided with complete information as to the operating conditions existing. Additional accessory equipment contained within the hull 10 includes water level gauges 98, a bilge pump 99, an air compressor 101, accumulators 102 and service pump 103. Ballast tanks 104 and a ballast pump 105 are located within the hull to permit control of the buoyancy of the dredge unit so that the load of the unit upon the column 72 is minimized. Column 72 may also be provided with ballast tanks.

Although preferred embodiments of this invention are illustrated, it is to be understood that various modifications and rearrangements of parts may be resorted to without departing from the scope of the invention as defined in the following claims.

What is claimed is:

1. A dredge unit for dredging the bottom under a body of water comprising a water-tight hull adapted to be submerged, said hull having an elongated horizontally extending cylindrical main portion and an elongated generally conical extension on said hull extending from one end of said main portion and inclined downwardly therefrom, a cutter at the end of said extension having a cross-section at least as great as the adjacent portion of said extension, a cutter motor in said extension located at a position spaced from said cutter, a drive connected from said motor to said cutter rotating said cutter to loosen underwater bottom material, a stuffing box on said extension preventing water from entering said hull along said drive, a hydraulic pump in said main portion, an inlet for said pump adjacent said cutter, an outlet for said pump connected to a remote location spaced from said hull, and a pump motor in said main portion connected to drive said pump, and support means being operable to support and move said hull with all portions of said hull excepting the portions adjacent said cutter substantially spaced from said bottom and said main portion maintained in a substantially horizontal position while said hull is adjacent to said bottom.

2. A dredge unit for dredging the bottom under a body of water comprising a water-tight hull adapted to be submerged, said hull having an elongated horizontally extending cylindrical main portion and an elongated generally conical extension on said hull extending from one end thereof and inclined downwardly therefrom, a rotary cutter at the end of said extension having a cross-section at least as great as the cross-section of the portions of said extension adjacent thereto, a cutter motor in said extension located at a position spaced from said cutter, a drive connected from said motor to said cutter rotating said cutter, a stuffing box on said extension preventing water from entering said hull along said drive, a hydraulic pump in said main portion, an inlet for said pump adjacent said cutter, an outlet for said pump connected to a location remote from said hull, a pump motor in said main portion connected to drive said pump, support means connected from a location remote from said hull to said hull operable to position, support and move said hull with respect to said bottom while maintaining said main portions substantially horizontal, and controls connected to said motors and drives operable from a location remote from said hull to control said pump and cutter.

References Cited by the Examiner
UNITED STATES PATENTS

| | | | |
|---|---|---|---|
| 813,935 | 2/06 | Avery | 37—56 |
| 885,930 | 4/08 | Lake | 37—56 |
| 890,764 | 6/08 | Geare | 37—64 |
| 1,997,149 | 4/35 | Lake | 61—69 |
| 2,359,964 | 10/44 | Barnett | 61—69 |
| 2,361,404 | 10/44 | Kalix | 37—67 |

FOREIGN PATENTS

| | | |
|---|---|---|
| 442,579 | 2/36 | Great Britain. |
| 523,845 | 4/55 | Italy. |
| 125,763 | 2/60 | Russia. |

BENJAMIN HERSH, *Primary Examiner.*

MILTON KAUFMAN, *Examiner.*